US009817353B2

(12) United States Patent
Brown et al.

(10) Patent No.: US 9,817,353 B2
(45) Date of Patent: Nov. 14, 2017

(54) METHOD AND SYSTEM FOR MANAGING SERVICE INTERVALS FOR RELATED COMPONENTS

(75) Inventors: Joanna Brown, Fairport, NY (US); Timothy Thomas, Fairport, NY (US); Nitin Shinoy, Webster, NY (US); Cheryl Koenig, Ontario, NY (US); Michael Soures, Webster, NY (US); Kathleen Giuffrida, Honeoye, NY (US); Michael Kirby, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1898 days.

(21) Appl. No.: 12/429,775

(22) Filed: Apr. 24, 2009

(65) Prior Publication Data

US 2010/0272450 A1 Oct. 28, 2010

(51) Int. Cl.
*G06Q 10/00* (2012.01)
*G03G 15/00* (2006.01)

(52) U.S. Cl.
CPC ....... *G03G 15/553* (2013.01); *G03G 15/5075* (2013.01)

(58) Field of Classification Search
None
See application file for complete search history.

(56) References Cited

U.S. PATENT DOCUMENTS

| | | | | |
|---|---|---|---|---|
| 3,514,202 | A * | 5/1970 | Mau et al. | 399/220 |
| 3,710,079 | A * | 1/1973 | Cralle et al. | 235/91 R |
| 4,496,237 | A | 1/1985 | Schron | 355/14 C |
| 5,021,828 | A | 6/1991 | Yamaguchi et al. | 355/209 |
| 6,141,507 | A * | 10/2000 | Sawada | 399/8 |
| 6,556,926 | B1 | 4/2003 | Haines | 702/34 |
| 6,606,462 | B2 | 8/2003 | Siegel et al. | 399/24 |
| 6,633,732 | B2 | 10/2003 | Siegel et al. | 399/10 |
| 6,754,453 | B2 * | 6/2004 | Siegel et al. | 399/24 |
| 7,321,896 | B1 * | 1/2008 | Ohashi | |
| 7,797,147 | B2 * | 9/2010 | Vinberg et al. | 703/22 |

(Continued)

FOREIGN PATENT DOCUMENTS

| | | | | |
|---|---|---|---|---|
| WO | WO 2009/070347 A1 * | 6/2009 | | G07C 5/00 |

OTHER PUBLICATIONS

Shey-Huei Sheu et al., Optimal Number of Minimal Repairs before Replacement of a System Subject to Shocks, 1996, Naval Research Logistics, vol. 43, pp. 319-333.*

*Primary Examiner* — Paul R Fisher
(74) *Attorney, Agent, or Firm* — Kevin Soules; Kermit D. Lopez; Luis M. Ortiz

(57) ABSTRACT

A method and system for managing one or more high frequency service items associated with a device. A parent/child relationship between the high frequency service items can be defined to track replacement of components based on a service action related to a child component. A taxonomy of related service items and servicing functions can be specified in an XML document associated with the rendering system. The relationship between the high frequency service items can be indicated utilizing a related component indicator and a HFSI counter. A parent component can be replaced by a maintenance operator and an aggregate child component can be rebuilt by a service engineer in order to retain the component life thereby reducing down time and service costs.

20 Claims, 5 Drawing Sheets

(56) References Cited

U.S. PATENT DOCUMENTS

| | | | | |
|---|---|---|---|---|
| 7,865,090 | B2 * | 1/2011 | Katoh | 399/24 |
| 2003/0123077 | A1 | 7/2003 | Siegel et al. | 358/1.14 |
| 2003/0123885 | A1 | 7/2003 | Siegel et al. | 399/10 |
| 2003/0133720 | A1 | 7/2003 | Siegel et al. | 399/19 |
| 2005/0144183 | A1 | 6/2005 | McQuown et al. | 707/100 |
| 2005/0187838 | A1 | 8/2005 | Squeglia et al. | 705/29 |
| 2009/0073427 | A1 | 3/2009 | Hackney et al. | 356/237.1 |

* cited by examiner

METHOD AND SYSTEM FOR MANAGING SERVICE INTERVALS FOR RELATED COMPONENTS

TECHNICAL FIELD

Embodiments are generally related to devices such as rendering devices, finishing devices, feeding devices, and the like. Embodiments also relate in general to the field of computers and similar technologies and, in particular, to software utilized in this field. In addition, embodiments relate to HFSI (High Frequency Service Item) and CRU (Customer Replaceable Unit) components associated with complex systems.

BACKGROUND OF THE INVENTION

Rendering devices such as printers, for example, often include components that wear with usage and eventually may require replacement. For example, laser printers typically include internal rollers for transporting print media, an electro-photographic drum for transferring toner to the print media, and a fuser for fusing toner to the print media. Such components wear with usage and may need to be replaced, sometimes more than once, during the life of the rendering device. An HFSI is an integral component that can be replaced at the end of life or at the time of premature failure of one or more components. HFSI components enable a variety of machine subsystems to be incorporated into a single unit while maximizing the useful life of each component.

A typical HFSI can be configured from multiple components, each component having an independent HFSI counter. A number of such counters may be each associated with a particular replaceable component so that the HFSI counters can be reset independently. Such counters can be utilized for scheduling replacement of the individual component when the counter associated with the component attains a predetermined threshold value, or when directed to in concert with service documentation. The HFSI needs to be replaced completely when any of the components of the HFSI reach a count indicating the need for replacement.

One of the problems associated with such prior art approaches is that a conservative estimate of life needs to be provided so that the component does not fail before the scheduled replacement date, which means that a certain measure of useful life is being wasted. Such an approach can lead to the failure of certain components being changed when the related components are changed, thereby resulting in extra service calls or poor performance. Additionally, customers and service personnel may find it necessary to scroll through a large component list in order to find related components.

Based on the foregoing, it is believed that a need exists for an improved method and system for managing service intervals for related components associated with a particular device such as, for example, a rendering device. A need also exists for defining a parent/child relationship between high frequency service items.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved rendering device such as a printer, and/or other related devices such as a finishing device or a feeding device.

It is another aspect of the present invention to provide for an improved method and system for managing service intervals for related components associated with a device to maximize utilization of components and reliability of the device.

It is a further aspect of the present invention to provide for an improved method for defining a parent/child relationship between high frequency service items.

The aforementioned aspects and other objectives and advantages can now be achieved as described herein. A method and system for managing one or more high frequency service items associated with a device (e.g., rendering device, finishing device, feeding device, etc) is disclosed herein. A parent/child relationship between the high frequency service items can be defined to track replacement of components based on a service action related to a child component. A taxonomy of related service items and servicing functions can be specified in an XML document associated with the rendering system. The relationship between the high frequency service items can be indicated utilizing a related component indicator and a HFSI counter. A parent component can be replaced by a maintenance operator and individual child components can be replaced or repaired by a service engineer in order to retain the component life of those children whose component life counters indicate that they are not yet ready to be replaced thereby reducing down time and service costs.

The high frequency service items are an integral component that requires the service action (e.g., cleaning, repairing, rebuilding, replacing, calibration, and so forth) to be performed at the end of life or at a time of premature failure of one or more components. The high frequency service items are highly related to other service items associated with the device. The service items can be replaced after a certain count of instances the HFSI counter associated with the child component is reset (each time the child component is serviced). The XML based file can be updated via a remote service provider in order to change a service relationship between the high frequency service items.

The parent component can be named initially. If the child component reaches a predetermined threshold, an indicator for replacing the parent component can be automatically displayed. The child component associated with the parent component can be rebuilt by the service engineer and a new name can be created to retain the life of the parent component. A service count associated with the child component can be configured to follow a count associated with the parent component on replacement of the parent component into the device.

The complex list of components can be displayed in a hierarchical structure utilizing the related component indicator and stored in a HFSI memory. The relationship between the parent component and the child component can be configured such that the entire child components need to be replaced at a service call. Such an approach provides a separation of replacing an aggregate component from rebuilding an aggregate component. The parent/child relationship can be utilized to coordinate part replacement between the components in order to maximize both the utilization of parts and the reliability of the device.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
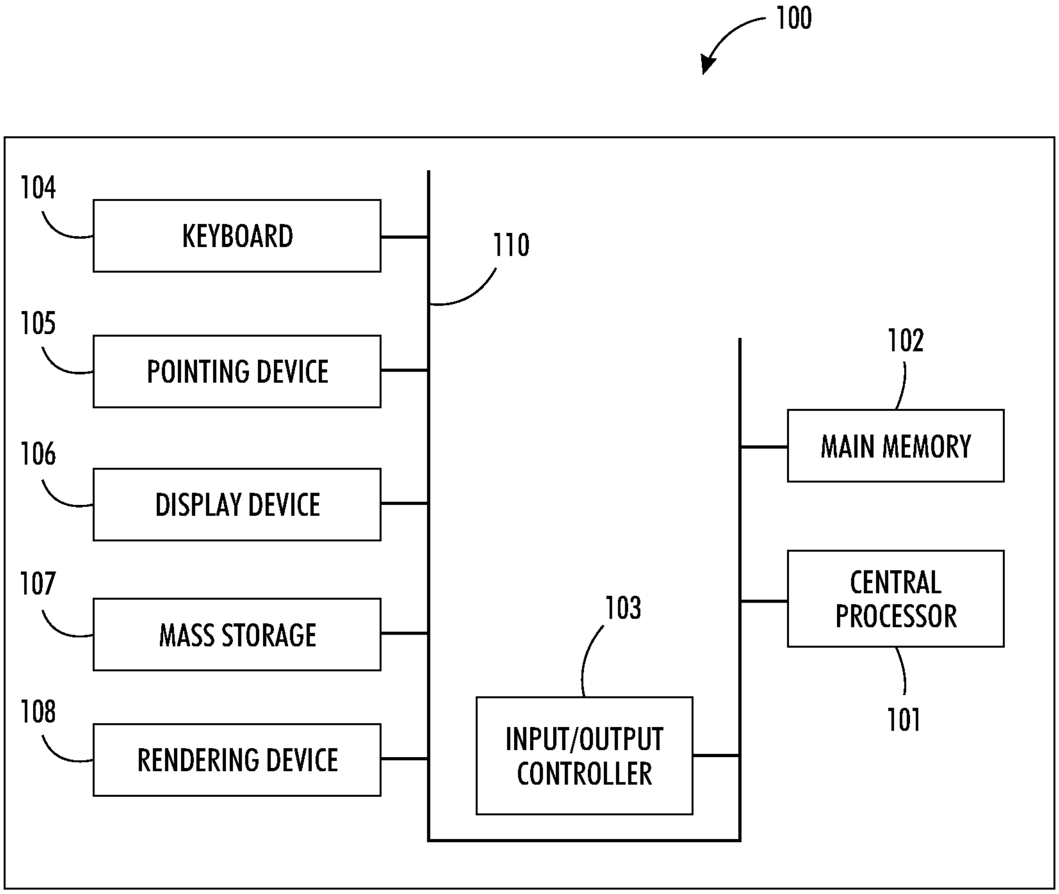
FIG. 1 illustrates a schematic view of a data-processing system in which the present invention may be embodied.
Figure 2:
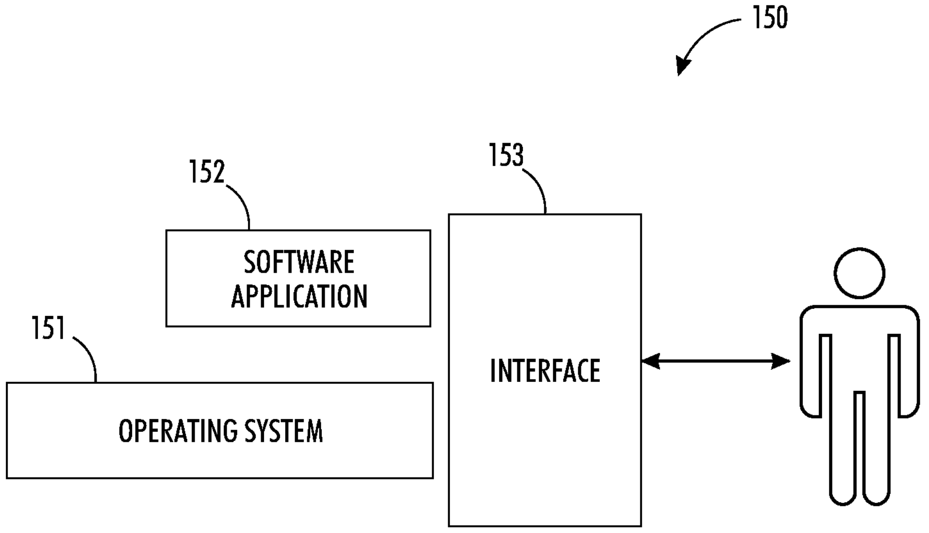
FIG. 2 illustrates a schematic view of a software system including an operating system, application software, and a user interface for carrying out the present invention.
Figure 3:
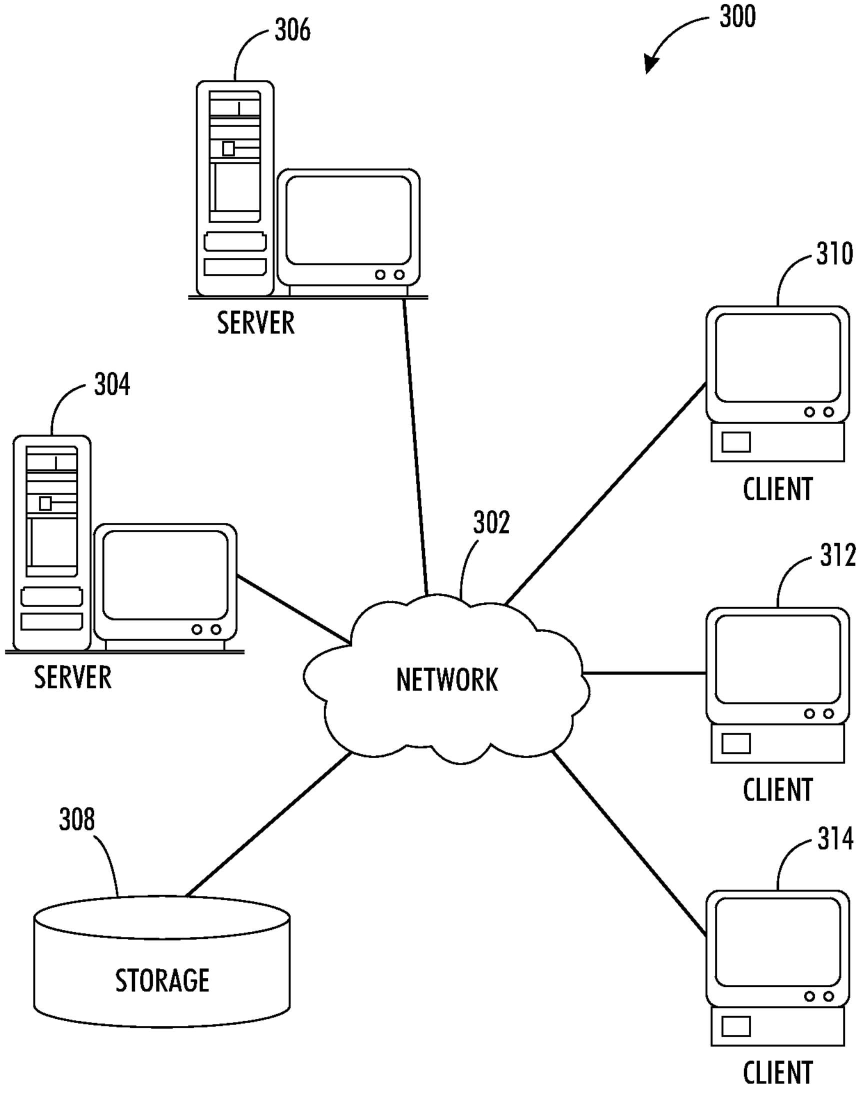
FIG. 3 illustrates a graphical representation of a network of data processing systems in which aspects of the present invention may be implemented.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, may be included in the data-processing apparatus 100 as desired. Note that the rendering device 108 may constitute, for example, a printer, a copier, fax machine, scanner, and/or other types of rendering components, depending upon design considerations. As illustrated, the various components of the data-processing apparatus 100 communicate through a system bus 110 or similar architecture. Note that although the discussion herein refers to a rendering device 108, other types of devices may also be utilized in place or in addition to rendering device 108. Examples of such devices including feeding devices and/or finishing devices, depending upon design considerations.

FIG. 2 illustrates a computer software system 150 for directing the operation of the data-processing apparatus 100 depicted in FIG. 1. Software system 150, which is stored in system memory 102 and on disk memory 107, can include a kernel or operating system 151 and a shell or interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

The interface 153, which is preferably a graphical user interface (GUI), also serves to display results, whereupon the user may supply additional inputs or terminate a given session. In one possible embodiment, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to operating system 151 and interface 153. Application module 152, on the other hand, can include instructions such as the various operations described herein with respect to the various components and modules described herein such as, for example, the method 500 depicted in FIG. 5.

FIG. 3 illustrates a graphical representation of a network of data processing systems in which aspects of the present invention may be implemented. Network data processing system 300 is a network of computers in which embodiments of the present invention may be implemented. Network data processing system 300 contains network 302, which is the medium used to provide communications links between various devices and computers connected together within network data processing apparatus 100. Network 302 may include connections, such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing apparatus 100 depicted in FIG. 1 can be, for example, a client such as client 310, 312, and/or 314. Alternatively, data-processing apparatus 100 can be implemented as a server such as servers 304 and/or 306, depending upon design considerations.

In the depicted example, server 304 provides data such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers which provide equivalent content.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 300 also may be implemented as a number of different types of networks such as, for example, an intranet, a local area network (LAN), or a wide area network (WAN). FIG. 1 is intended as an example and not as an architectural limitation for different embodiments of the present invention.

The following description is presented with respect to embodiments of the present invention, which can be embodied in the context of a data-processing system such as data-processing apparatus 100 and computer software system 150 depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 4:
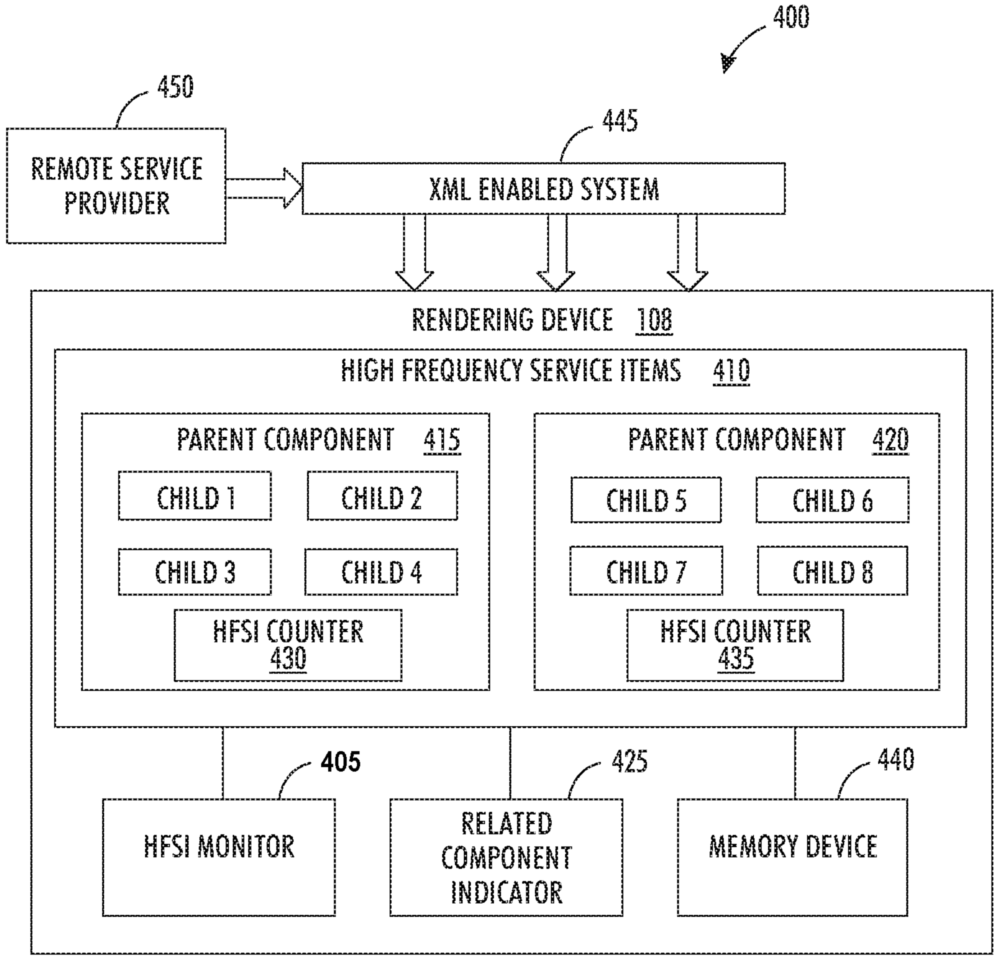
FIG. 4 illustrates a block diagram of a device associated with one or more high frequency service items, in accordance with a preferred embodiment.

FIG. 4 illustrates a block diagram 400 of a rendering device 108, which can be associated with HFSI 410, in accordance with a preferred embodiment. Note that in FIGS. 1-5, identical or similar blocks are generally indicated by identical reference numerals. FIG. 4 schematically depicts a rendering device 108 incorporating the features of the present invention therein. It can be appreciated, of course, that the following discussion related to high frequency service items 410 of the present invention may be employed in a wide variety of devices and is not specifically limited in its application to the particular embodiment depicted herein. The data-processing apparatus 100 can be utilized to generate a document in an electronic form and to transmit the document (in the form of a rendering job) to the rendering device 108. The rendering device 108 receives the rendering job and prints the document.

In general, high frequency service items can be defined as an integral component to modern rendering devices such as rendering device 108 to help a service personnel know when to replace components associated with the rendering device 108. The more complex products can possess several hundred high frequency service items and the components are mechanically and electrically related to each other. The service items 410 associated with the rendering device 108 can be defined utilizing a parent/child relationship. The parent components 415 and 420 can be made up of multiple parts (the children), each part having a HFSI counter 430 and 435 respectively. The service items 410 include a number of such counters 430 and 435 each associated with a particular replaceable element so that they can be reset independently.

The service items 410 further include a memory device 440 and a HFSI monitor 405 integral therewith. The service items 410 may include multiple memories of different types such as, for example, ROM, RAM, EEPROM, magnetic, or optical. Data relating to the service items 410 may be stored in the memory device 440. For example, a preset number of total images for the service items 410, various threshold(s) values associated with the service items 410, and various predetermined information can be stored in the memory device 440. The high frequency service items 410 require a service action to be performed at the end of life or at the time of premature failure of one or more components. The service action includes operations such as, for example, cleaning, calibration, rebuilding, repairing and replacing. The HFSI are highly related to other service items associated with the rendering device 108.

The service items 410 may represent any component in the rendering device 108 that is subject to wear over the life of the rendering device 108. For example, the component rendering device 108 may comprise high frequency service items such as, for example, a photoreceptor cartridge, a developer cartridge, a toner cartridge, an ink cartridge, print head, and print cartridge each of which is generally designed to function for a preset number of images in the form of prints or copies. These components are described for purposes of clarity and specificity; however, they should not be interpreted in any limiting way.

The parent/child relationship between the service items 410 can be defined in order to provide the user with the ability to manage "partial-life" components. An XML based system 445 can be utilized to configure the parent/child relationship between the service items 410 associated with the rendering device 108. The XML based system 445 can be updated via a remote service provider 450 in order to change the service relationship between the service items 410, if needed. The parent components 415 and 420 can be marked for replacement when the child components associated with the parent components 415 and 420 reaches a due state. The relationship between the parent and the child components 415 and 420 can be configured such that the entire child components need to be replaced at the service call. The parent/child relationships can provide the user with the ability to track the replacement of components 415 and 420 based on the service actions of the child components. The service items 410 can be replaced after a certain count of instances the child component is reset (each time the child component is serviced). For example, in some situations the wire assembly can be replaced every third time the wires are cleaned. The counter associated with the wire assembly represents the number of times the child component is reset (each time the wire is cleaned). A service count associated with the child component can be configured to follow a count associated with the parent components 415 and 420 on replacement of the parent components 415 and 420 into the rendering device 108.

The rendering device 108 further includes a related component indicator 425 that provides the service items 410 to reflect a relationship with each other. The parent components 415 and 420 end of life threshold is a function of its related child component and the HFSI counter 430 and 435. For example, a wire assembly is determined to have passed the threshold when the related component associated with the wire assembly is reset three times. Customers that may forget to clean the wires can get a warning when the wire assembly has reached the end of life. The related component indicator 425 displays a complex list of components on a hierarchical structure in the HFSI monitor 405. Note that the embodiments discussed herein generally relate to a rendering device. It can be appreciated, however, that such embodiments can be implemented in the context of other systems and devices and are not limited to the rendering device. The discussion of rendering devices, as utilized herein, is presented for general illustrative purposes only.

Figure 5:
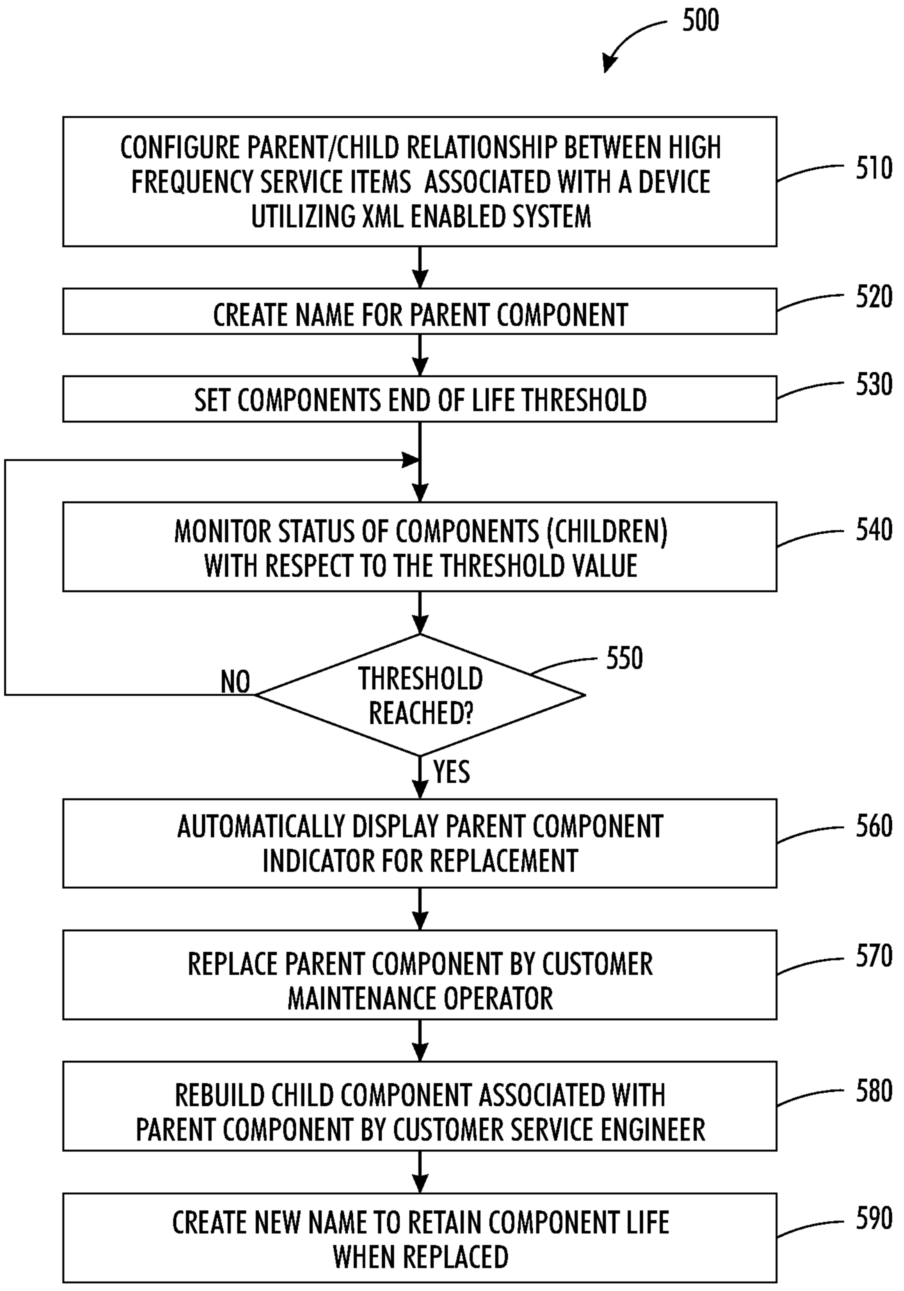
FIG. 5 illustrates a detailed flow chart of operations illustrating logical operational steps of a method for managing service intervals for related components utilizing high frequency service counters, in accordance with a preferred embodiment.

FIG. 5 illustrates a flow chart of operations depicting a method 500 for managing service intervals for related components utilizing high frequency service items 410, in accordance with a preferred embodiment. Note that the method 500 can be implemented in the context of a computer-useable medium that contains a program product. The method 500 depicted in FIG. 5 can also be implemented in a computer-usable medium containing a program product.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 500 described herein can be deployed as process software in the context of a computer system or data-processing system as that depicted in FIGS. 1-3.

The parent/child relationship between high frequency service items 410 associated with the rendering device 108 can be configured utilizing the XML enabled system 445, as depicted at block 510. For example, the parent/child relationship can be defined in terms of the HFSI Id (e.g. <HFSI id="5" parent="10" name="Parent"/> <HFSI id="10" name="Child">). The XML enabled system 445 can be updated via remote service providers 450 in order to change the service relationship between the service items 410 if data from the field indicates for a more optimum replacement strategy. A name for the parent components 415 and 420 can be created, as shown at block 520. The end of life threshold for the parent components 415 and 420 can be set, as illustrated at block 530.

Thereafter, the status of the components (children) with respect to the threshold value can be monitored in the HFSI monitor 405, as shown at block 540. A determination can be made if the threshold has been reached, as depicted at block 550. If the threshold condition is reached, the parent component indicator 425 can be automatically displayed for replacement, as illustrated at block 560. Such an approach allows the parent components 415 and 420 to be marked for replacement if any of its children need replacing. The parent components 415 and 420 can be replaced by the customer maintenance operator, as shown at block 570. The child component associated with parent components 415 and 420 can be rebuilt by the customer service engineer (CSE), as illustrated at block 580.

A new name can be created for the parent components 415 and 420 when replaced in order to retain the component life associated with the parent components 415 and 420, as depicted at block 590. The new name can be created, or selected from the set of previously known names, upon replacement of the parent components 415 and 420. Such an approach provides aggregate components that are "rebuilt" by the CSE to retain some component life when replaced. Note that the access to the children component can be restricted to the CSE, but aggregate components can be replaceable by the customer maintenance operators. Note that a parent component can be replaced by a maintenance operator and individual child components can be replaced or repaired by a service engineer in order to retain the component life of those children whose component life counters indicate that they are not yet ready to be replaced thereby reducing down time and service costs. This approach can provide a separation of the concept of replacing an aggregate component from rebuilding an aggregate component. The CSE can "reset" individual HFSI 410 of named aggregates that are not currently in the device 108 when the CSE is rebuilding an aggregate component that is outside the rendering device 108. The residual component life is accurate when the component is ultimately placed back in service.

For example, the fuser module (the parent) associated with the rendering device 108 includes sub parts (the children) such as, for example, stripper fingers, fuser roll, fuser thermistors, fuser drawer connector, and fuser heat lamp. The fuser assembly may be customer replaceable, but the individual components associated with the fuser assembly are not replaceable. The customer can replace the fuser assembly and put it on the "shelf" and the CSE can replace individual components as needed. The "rebuilt" fuser assembly can be put back in the system when the customer replaces the current one. The "rebuilt" fuser assembly can be named and can "inherit" the component life for any component not replaced.

Note that the service counts associated with the parent and each of the children are associated with a "name" for an assembly thereof. This assembly can be replaced with another assembly of a different name. The other assembly, when replaced, can have its service counts restored to what they were when they were removed from the machine. This can be achieved either through storing the service counts in a crum-like tag (RFID Tag) on the assembly, or by having the device remember the name and associated counts, and when the user selects the "replace" option, they can pick a previously existing name or create a new one. This allows the operator to have two assemblies at the customer sight. When the parent needs to be replaced, they can pull the whole assembly, pop in a new one, and get the customer back up. The assembly with the child HFSI that needs replacing can be repaired or replaced and then placed "in the cabinet" for use at a future time.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It is believed that by utilizing the parent/child relationship described herein, part replacement between components can be coordinated in such a manner as to maximize both the utilization of parts and the reliability of the system. The aggregate part replacement can be treated different from the component part replacement in order to allow different users and service actions to be performed, thereby reducing down time and service costs.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for managing high frequency service items associated with a rendering device, said method comprising:

configuring a parent/child relationship in association with at least one high frequency service item utilizing an XML based computer system, wherein said at least one high frequency service item is associated with and a component of said rendering device, said parent/child relationship comprising a parent component associated with said rendering device and at least one child component comprising at least one sub-part of said parent component wherein said parent component is customer replaceable;

storing a preset number of total images for said at least one high frequency service item and at least one threshold value associate with said at least one high frequency service item in a memory device integrated in said at least one high frequency service item;

monitoring a status of said at least one high frequency service item with respect to said at least one threshold value utilizing said XML based computer system with a high frequency service interval monitor integrated in said high frequency service item;

updating said XML based computer system by a remote service provider connected to said XML based computer system over a wireless communication channel when said parent/child relationship changes;

displaying a hierarchical structure illustrative of said parent/child relationships in a graphical user interface provided by said high frequency service interval monitor on a display associated with said rendering device;

activating a parent component indicator on said rendering device when said at least one threshold value is reached;

performing a service action on said at least one child component when a service threshold for said child component is exceeded; and replacing said parent component if said at least one child component exceeds a threshold value for said service action, thereby maximizing a utilization of said at least one high frequency service item and a reliability with respect to said rendering device.

2. The method of claim 1 further comprising configuring at least one service count associated with said at least one child component to follow a count associated with said parent component upon replacement of said parent component.

3. The method of claim 2 further comprising configuring said parent/child relationship to replace at least one parent component with a replacement parent component if any of said child components of said parent component exceed said threshold value for service action.

4. The method of claim 3 further comprising:

repairing all said child components of said at least one parent component after said parent component has been replaced by said replacement parent component;

saving said parent component;

removing said replacement parent component if any of said child components of said parent component exceed said threshold value for service action; and reinstalling said parent component.

5. The method of claim 4 wherein configuring said parent/child relationship in association with said at least one high frequency service item further comprises:

creating a name indicative of said parent component before a replacement of said parent component; and creating a new name indicative of said parent component after replacement of said parent component.

6. The method of claim 5 further comprising:

restricting access to said child components to everyone but a service engineer.

7. The method of claim 6 further comprising configuring a hierarchical structure;

expressing via said hierarchical structure a relationship and a servicing function associated with said at least one high frequency service item utilizing a related component indicator and a counter.

8. The method of claim 7 wherein said service action comprises at least one of the following types of actions: a rebuild action, a cleaning action, or a calibrate action.

9. The method of claim 8 wherein said parent component is a customer replaceable component and said at least one child component is a service engineer serviceable component.

10. The method of claim 9 further comprising permitting rebuilding of said at least one parent component in order to reduce down time and service cost associated with said at least one high frequency service item.

11. The method of claim 10 further comprising changing said service relationship between said at least one high frequency service item by updating said XML based file via at least one remote service provider thereby providing more optimum replacement strategy.

12. The method of claim 11 further comprising:

associating said at least one service count with a particular name of an assembly thereof;

replacing said assembly with another assembly; and replacing a name of said another assembly with a different name.

13. The method of claim 12 further comprising:

storing said at least one service count in an RFID tag on said assembly.

14. The method of claim 13 further comprising:

storing said at least one count and said particular name in a memory associated with said rendering device.

15. A system for managing high frequency service items associated with a rendering device, said system comprising:

a rendering device;

a processor;

a data bus coupled to the processor; and an XML based computer-usable medium embodying computer code, the computer-usable medium being coupled to the data bus, the computer program code comprising instructions executable by the processor and configured for:

configuring a parent/child relationship in association with at least one high frequency service item, wherein said at least one high frequency service item is associated with and a component of said rendering device, said parent/child relationship comprising a parent component associated with said rendering device and at least one child component comprising at least one sub-part of said parent component wherein said parent component is customer replaceable;

storing a preset number of total images for said at least one high frequency service item and at least one threshold value associate with said at least one high frequency service item in a memory device integrated in said at least one high frequency service item;

monitoring a status of said at least one high frequency service item with respect to said at least one threshold value with a high frequency service interval monitor integrated in said high frequency service item;

updating said XML based computer system by a remote service provider when said parent/child relationship changes;

displaying a hierarchical structure illustrative of said parent/child relationships in a graphical user interface provided by said high frequency service interval monitor on a display associated with said rendering device;

activating a parent component indicator on said rendering device when said at least one threshold value is reached;

performing a service action on said at least one child component when a service threshold for said child component is exceeded; and replacing said parent component if said at least one child component exceeds said threshold value for said service action, thereby maximizing a utilization of said at least one high frequency service item and a reliability with respect to said device.

16. The system of claim 15 wherein said instructions are further configured for modifying at least one service count associated with said at least one child component to follow a count associated with said parent component upon replacement of said parent component.

17. The system of claim 16 wherein said instructions are further configured for modifying said parent/child relationship to replace at least one parent component with a replacement parent component if any of said child components of said parent component exceed said threshold value for service action.

18. The system of claim 17 further comprising:

a replacement parent component wherein all said child components of said at least one parent component are repaired after said parent component has been replaced by said replacement parent component, said parent component is saved, said replacement parent component is removed if any of said child components of said parent component exceed said threshold value for service action, and said parent component is reinstalled.

19. The system of claim 18 wherein said instructions are further configured for providing a hierarchical structure; and expressing via said hierarchical structure a relationship and a servicing function associated with said at least one high frequency service item utilizing a related component indicator and a counter.

20. A non-transitory computer-usable medium for managing high frequency service items associated with a rendering device, said computer-usable medium embodying computer program code, said computer program code comprising computer executable instructions configured for:

configuring a parent/child relationship in association with at least one high frequency service item utilizing an XML based computer system, wherein said at least one high frequency service item is associated with and a component of said rendering device, said parent/child relationship comprising a parent component associated with said rendering device and at least one child component comprising at least one sub-part of said parent component wherein said parent component is customer replaceable;

storing a preset number of total images for said at least one high frequency service item and at least one threshold value associate with said at least one high frequency service item in a memory device integrated in said at least one high frequency service item;

monitoring a status of said at least one high frequency service item with respect to said at least one threshold value with a high frequency service interval monitor integrated in said high frequency service item;

updating said XML based computer system by a remote service provider when said parent/child relationship changes;

displaying a hierarchical structure illustrative of said parent/child relationships in a graphical user interface provided by said high frequency service interval monitor on a display associated with said rendering device;

activating a parent component indicator on said rendering device when said at least one threshold value is reached;

performing a service action on said at least one child component when a service threshold for said child component is exceeded; and replacing said parent component if said at least one child component exceeds a threshold value for said service action thereby maximizing a utilization of said at least one high frequency service item and a reliability with respect to said device.

* * * * *